United States Patent [19]
Maier

[11] 3,957,720
[45] May 18, 1976

[54] PROCESS FOR IMPARTING FLAME RESISTANCE TO COMBUSTIBLE MATERIAL

[75] Inventor: Ludwig Maier, Kilchberg, Switzerland

[73] Assignee: Monsanto Company, St. Louis, Mo.

[22] Filed: Aug. 26, 1974

[21] Appl. No.: 501,009

[30] Foreign Application Priority Data
Sept. 5, 1973  Switzerland.................... 12731/73

[52] U.S. Cl...................... 260/45.7 R; 260/45.7 PS
[51] Int. Cl.²........................................ C08K 5/49
[58] Field of Search............................. 260/45.7 PS; 252/46.5 UA

[56] References Cited
UNITED STATES PATENTS

| | | | |
|---|---|---|---|
| 2,599,341 | 6/1952 | McDermott | 260/45.7 PS |
| 3,012,004 | 12/1961 | Baker | 260/45.7 PS |
| 3,314,917 | 4/1967 | Herbstmann | 260/45.7 PS |
| 3,325,444 | 10/1967 | Best | 260/45.7 PS |

*Primary Examiner*—Donald E. Czaja
*Assistant Examiner*—William E. Parker

[57] ABSTRACT

This invention relates to a process for imparting flame resistance to combustible material, and an agent for carrying out the process. It also relates to a flame proofing agent used in the process and to the improved material rendered flame resistant by the process.

10 Claims, No Drawings

PROCESS FOR IMPARTING FLAME RESISTANCE TO COMBUSTIBLE MATERIAL

The process of this invention is characterized in that the combustible material is provided with a compound of formula (I) 

wherein $R^1$, $R^2$, $R^3$ and $R^4$ signify hydrocabon rests, and two of these rests taken together signify a corresponding phosphorus-containing ring.

Examples of combustible materials which can be rendered flame resistant according to the present process are polyamides such as nylon 6,6; polyesters such as polyethylene terephthalate; and polyolefins such as polystyrene.

The compounds to be used in this invention and having the formula (I) comprise biphosphine disulfides. The rests $R^1$ to $R^4$ may be alike or different. They contain preferably not more than 10 carbon atoms. Examples are alkyl groups such as methyl, ethyl, allyl, vinyl, n-propyl, iso-propyl, n-butyl, iso-butyl and tert-butyl; aryl groups such as phenyl, tolyl and xylyl; aralkyl groups such as benzyl and styryl; and cycloalkyl groups such as cyclopentyl, cyclopentenyl, cyclohexyl, cyclohexenyl and cyclohexadienyl. Particularly preferred are biphosphine disulfides having at most total 6 carbon atoms such as, e.g., tetramethylbiphosphine disulfide and dimethyl-diethylbiphosphine disulfide.

Examples of compounds having two of the rests $R^1$ to $R^4$ taken together to form a corresponding phosphorus-containing ring, may be expressed by the following general formulae:

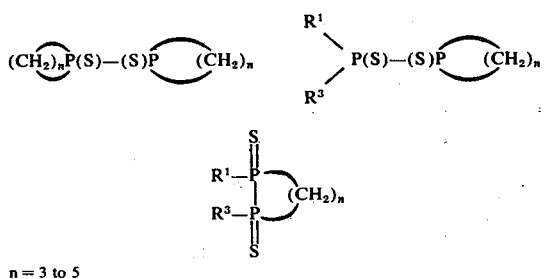

n = 3 to 5

The simple biphosphine disulfides and also the cyclic biphosphine disulfides are well known compounds. It is referred to the book "ORGANIC PHOSPHORUS COMPOUNDS" Wiley-Interscience, 1972, Volume 1, by G. M. Kosolapoff and L. Maier, where various methods of preparation are described.

The biphosphine disulfides utilizable herein are generally solid compounds. In order to impart flame resistance to synthetic material, a sufficient amount of finely divided compound can be admixed with powdered polymers, whereupon the mixture may be processed in usual manner by compression molding, extrusion, etc. Because the biphosphine disulfide herein proposed are relatively thermally stable, they can also be added to the melt of the synthetic materials for flameproofing in the course of their preparation and processing, whereby a particularly intimate mixture is achieved.

The amount of added biphosphine disulfide is conveniently within the range of about 1 to 30% by weight, and preferably within the range of 2 to 15% by weight, based on the material plus additive.

Various phosphorus compounds have been proposed in the prior art for flameproofing of combustible materials. The applicability of phosphorus compounds having a grouping P=S, i.e. phosphine sulfides, to said purpose has not been disclosed in the prior art. However, the herein proposed biphosphine disulfides are surprisingly effective as flameproofing agents.

EXAMPLE

Finely divided and dried 1,2-dimethyl-1,2-diethylbiphosphine disulfide (meso-form) was admixed with pulverized polyethylene terephthalate to obtain a 10% mixture. Then, the mixture was compression molded into sheets of 0.175 mm thickness and brought on fine scrim glass.

The sample was very light gray and looked and felt very good.

The oxygen index was determined in the following manner: A 5 × 15 cm sheet was mounted in a U-shaped frame surrounded by a chimney. The atmosphere in the chimney was a defined mixture of oxygen and nitrogen. The ratio of oxygen to nitrogen was varied so that a sheet sample ignited on the top will sustain combustion. The oxygen index is expressed by:

$$\text{Oxygen Index} = \frac{(O_2)}{(O_2) + (N_2)} \times 100$$

where $(O_2)$ is the partial volume of oxygen and $(N_2)$ is the partial volume of nitrogen.

The oxygen index reported is that oxygen and nitrogen mixture that will last sustain combustion.

| | Oxygen Index |
|---|---|
| Nylon 66 (no additive) | 21 |
| Nylon 66 + 10 wt.% additive | 27 |
| Polyethylene terephthalate (no additive) | 21 |
| Polyethylene terephthalate + 10 wt.% additive | 29 |

Similar results were obtained with 1,2-dimethyl-1,2-diethylbiphosphine disulfide (racemate), tetramethylbiphosphine disulfide, tetraethylbiphosphine disulfide, and 1,2-dimethyl-1,2-diphenylbiphosphine disulfide (meso form and racemate).

What is claimed is:

1. Process for imparting flame resistance to combustible material, selected from the group consisting of nylon 66, polyethylene terephthalate, and polystyrene, by combining therewith a compound having the formula (I) 

wherein $R^1$, $R^2$, $R^3$ and $R^4$ signify hydrocarbon rests, and two of these rests taken together signify a corresponding phosphorus-containing ring.

2. Process according to claim 1, characterized in that the combustible material is nylon 66.

3. Process according to claim 1, characterized in that the combustible material is polyethylene terephthalate.

4. Process according to claim 1, characterized in that the combustible material is polystyrene.

5. Process according to claim 1, characterized in that $R^1$ to $R^4$ contain a total of up to 10 carbon atoms.

6. A composition of matter comprising a polymer selected from the group consisting of nylon 66, polyethylene terephthalate and polystyrene containing as an additive from about 1 to 30% by weight, based on the weight of the polymer plus, additive of an additive having the formula

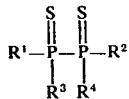

wherein $R^1$, $R^2$, $R^3$ and $R^4$ are hydrocarbon groups having a total of up to 10 carbon atoms, and two of these groups when taken together form a corresponding phosphorus-containing ring.

7. The composition of claim 6, wherein the said polymer is nylon 66.

8. The composition of claim 6 wherein the said polymer is polyethylene terephthalate.

9. the composition of claim 6, wherein the said polymer is polystyrene.

10. The composition of claim 6, wherein said phosphorus compound is 1,2-dimethyl-1,2-diethylbiphosphine disulfide.

* * * * *